US011715297B2

(12) United States Patent
Lee et al.

(10) Patent No.: US 11,715,297 B2
(45) Date of Patent: Aug. 1, 2023

(54) UTILIZING COMPUTER VISION AND MACHINE LEARNING MODELS FOR DETERMINING UTILIZATION METRICS FOR A SPACE

(71) Applicant: Accenture Global Solutions Limited, Dublin (IE)

(72) Inventors: Samantha Kingman Lee, Arlington, VA (US); Marc Bosch Ruiz, Cabin John, MD (US); Paul Michael Ott, Mechanicsburg, PA (US); Vijay Raman, Cupertino, CA (US)

(73) Assignee: Accenture Global Solutions Limited, Dublin (IE)

( * ) Notice: Subject to any disclaimer, the term of this patent is extended or adjusted under 35 U.S.C. 154(b) by 329 days.

(21) Appl. No.: 17/110,589

(22) Filed: Dec. 3, 2020

(65) Prior Publication Data

US 2022/0180100 A1 Jun. 9, 2022

(51) Int. Cl.
*G06V 20/20* (2022.01)
*B25J 9/16* (2006.01)
*G06T 17/00* (2006.01)
*G06V 20/40* (2022.01)

(52) U.S. Cl.
CPC ............ *G06V 20/20* (2022.01); *B25J 9/1679* (2013.01); *B25J 9/1697* (2013.01); *G06T 17/00* (2013.01); *G06V 20/41* (2022.01)

(58) Field of Classification Search
CPC ...... G06Q 10/08; G06T 17/00; G06V 10/454; G06V 20/41; G06V 20/647
See application file for complete search history.

(56) References Cited

U.S. PATENT DOCUMENTS

2017/0358087 A1* 12/2017 Armeni ................ G06V 20/10
2019/0385106 A1* 12/2019 Iventosch ............... G06N 3/02
2022/0036302 A1* 2/2022 Cella ..................... G06N 3/047

FOREIGN PATENT DOCUMENTS

WO WO-2018071204 A1 * 4/2018 ......... G02B 27/0172

OTHER PUBLICATIONS

Zeng et al., Multi-view Self-supervised Deep Learning for 6D Pose Estimation in the Amazon Picking Challenge, May 7, 2017, arXiv.org (Year: 2017).*

* cited by examiner

*Primary Examiner* — Sumati Lefkowitz
*Assistant Examiner* — Morgan Ruth Berasley
(74) *Attorney, Agent, or Firm* — Harrity & Harrity, LLP

(57) ABSTRACT

In some implementations, a device may receive image data identifying images of a space with racks and objects stored on the racks. The device may receive location data identifying location coordinates associated with the images. The device may process the image data and the location data to generate a merged point cloud identifying the racks and the objects in the space. The device may process the image data to generate mask data identifying at least a first mask for the racks and a second mask for the objects. The device may process the location data, the merged point cloud, and the mask data to generate a semantic point cloud identifying the racks and the objects in the space. The device may process the semantic point cloud, with a computer vision model, to calculate utilization metrics for the space.

20 Claims, 10 Drawing Sheets

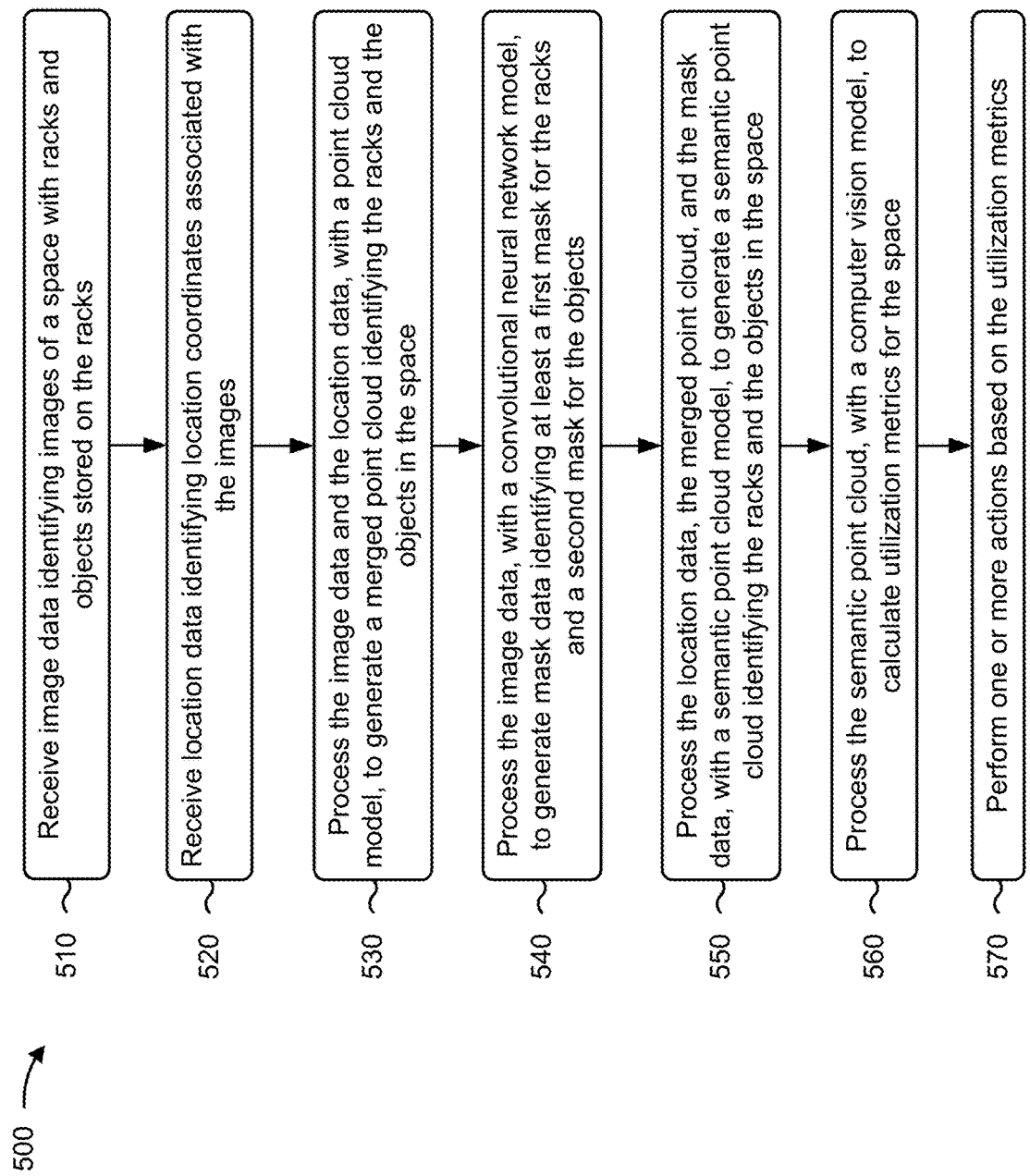

UTILIZING COMPUTER VISION AND MACHINE LEARNING MODELS FOR DETERMINING UTILIZATION METRICS FOR A SPACE

BACKGROUND

A space (e.g., a space in a warehouse) may be used to store inventory. The layout of the space may be designed to optimize various functions and to achieve maximum productivity and space utilization.

SUMMARY

In some implementations, a method includes receiving, by a device, image data identifying images of a space with racks and objects stored on the racks; receiving, by the device, location data identifying location coordinates associated with the images; processing, by the device, the image data and the location data, with a point cloud model, to generate a merged point cloud identifying the racks and the objects in the space; processing, by the device, the image data, with a convolutional neural network model, to generate mask data identifying at least a first mask for the racks and a second mask for the objects; processing, by the device, the location data, the merged point cloud, and the mask data, with a semantic point cloud model, to generate a semantic point cloud identifying the racks and the objects in the space; processing, by the device, the semantic point cloud, with a computer vision model, to calculate utilization metrics for the space; and performing, by the device, one or more actions based on the utilization metrics.

In some implementations, a device includes one or more memories; and one or more processors, communicatively coupled to the one or more memories, configured to: receive image data identifying images of a space with racks and objects stored on the racks; receive location data identifying location coordinates associated with the images; process the image data and the location data, with a point cloud model, to generate a merged point cloud identifying the racks and the objects in the space; process the image data, with a convolutional neural network model, to generate mask data identifying at least a first mask for the racks and a second mask for the objects; process the location data, the merged point cloud, and the mask data, with a semantic point cloud model, to generate a semantic point cloud identifying the racks and the objects in the space; process the semantic point cloud, with a computer vision model, to calculate utilization metrics for the space, wherein the utilization metrics include one or more of: a metric indicating utilization of the space, a metric indicating a capacity of the space, a metric indicating a capability classification of the space, a metric indicating a functional classification of the space, or a metric indicating an operational compliance of the space; and perform one or more actions based on the utilization metrics.

In some implementations, a non-transitory computer-readable medium storing a set of instructions includes one or more instructions that, when executed by one or more processors of a device, cause the device to: receive image data identifying images of a space with racks and objects stored on the racks; receive location data identifying location coordinates associated with the images; process the image data and the location data, with a point cloud model, to generate a merged point cloud identifying the racks and the objects in the space; process the image data, with a convolutional neural network model, to generate mask data identifying at least a first mask for the racks and a second mask for the objects; process the location data, the merged point cloud, and the mask data, with a semantic point cloud model, to generate a semantic point cloud identifying the racks and the objects in the space; process the semantic point cloud, with a computer vision model, to calculate utilization metrics for the space; generate a floorplan of the space based on the utilization metrics; and provide the floorplan for display.

BRIEF DESCRIPTION OF THE DRAWINGS

FIG. 5 is a flowchart of an example process relating to utilizing computer vision and machine learning for determining utilization metrics for a space.

DETAILED DESCRIPTION

Figure 1A:
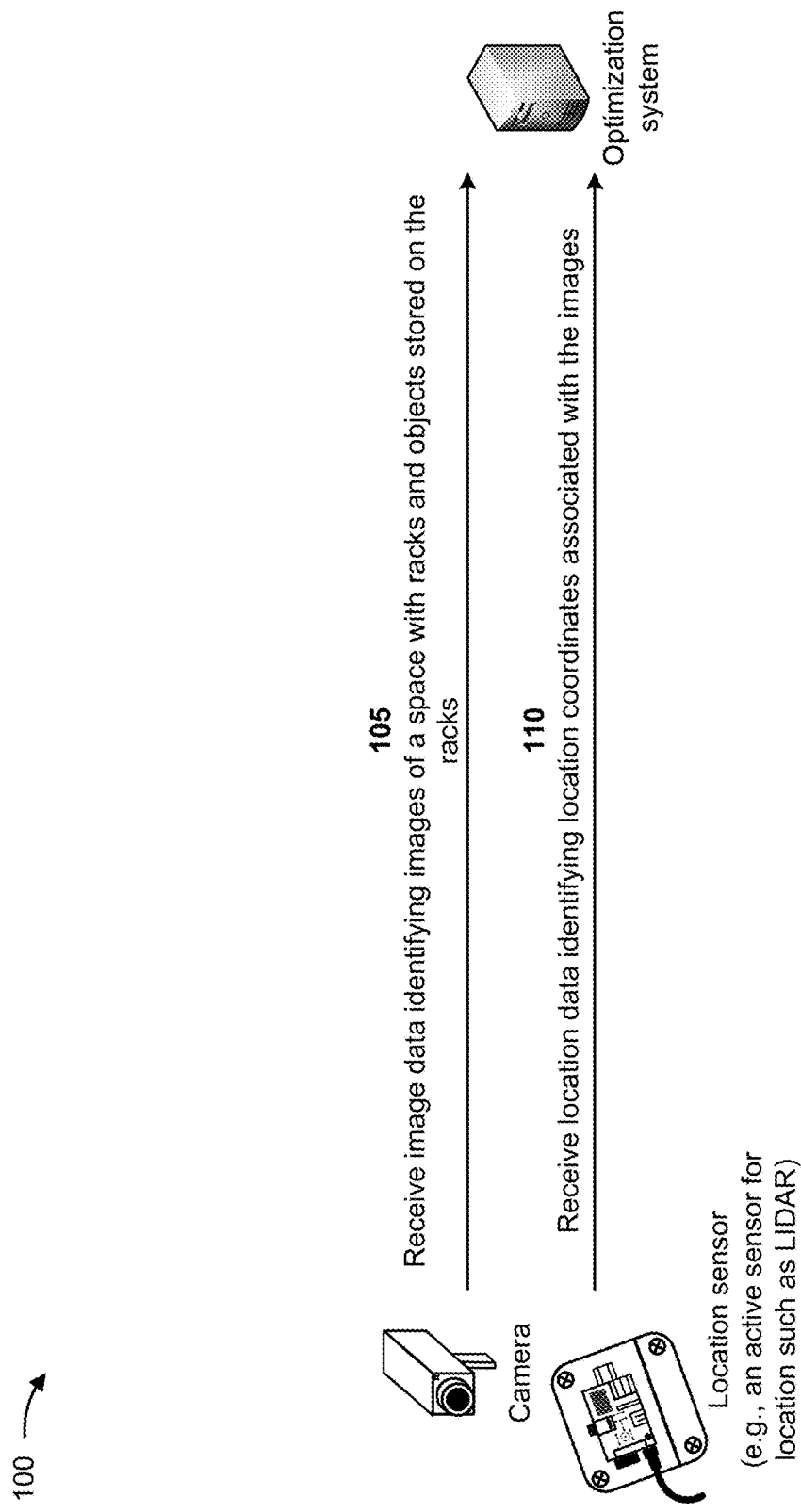
FIGS. 1A-1F are diagrams of an example implementation described herein.

The following detailed description of example implementations refers to the accompanying drawings. The same reference numbers in different drawings may identify the same or similar elements.

A common requirement for a warehouse operator is understanding how well the warehouse space is utilized and managed. The warehouse operator may employ industrial engineers to manually gather data through visual inspection and statistical sampling to compute warehouse operational metrics, such as utilization, capacity, capability classification, functional classification, operational compliance, and/or the like. The warehouse operator may utilize the warehouse operational metrics to plan a warehouse layout, increase stock on hand, improve workforce efficiency, and lower the cost to operate. However, manually gathering data through visual inspection and statistical sampling to compute the warehouse operational metrics is time consuming, error prone, and lacks consistent repeatability.

Implementations described herein relate to an optimization system that automates the collection and calculation of warehouse operational metrics, while archiving a blueprint of the warehouse space, by acquiring images and other visual representations (e.g. point clouds) and processing them using computer vision modeling to provide a standardized and consistent approach to the collection and calculation of warehouse operational metrics. For example, the optimization system may receive image data identifying images of a space with racks, objects stored on the racks, and location data identifying location coordinates associated with the images. The image data and the location data are collected using both passive and active sensors. The optimization system may process the image data and the location data, with a point cloud model, to generate a merged point cloud identifying the racks and the objects in the space. The optimization system may process the image data, with a convolutional neural network model, to generate mask data identifying at least a first mask for the racks and a second mask for the objects. The optimization system may process the location data, the merged point cloud, and the mask data, with a semantic point cloud model, to generate a semantic point cloud identifying the racks and the objects in the space. The optimization system may process the semantic point cloud, with a computer vision model, to calculate warehouse operational metrics for the space.

In this way, the optimization system utilizes computer vision to differentiate between objects within a space and then fuses three-dimensional (3D) data gathered using active sensors, with images from passive sensors to automatically obtain information about space utilization, capacity, and warehouse operations. The optimization system uses a unique process that extracts semantics and structure from the scene to estimate warehouse operational metrics and produce alerts. The optimization system uses a combination of supervised machine learning approaches to discover semantics in the scene and various computer vision algorithms, collectively described as hand-crafted features, to extract structure from 3D information. In this way, the optimization system provides an automated solution for the collection and calculation of warehouse operational metrics that is more accurate, consistent, and can be performed at a much greater frequency relative to manually collecting and calculating the warehouse operational metrics.

FIGS. 1A-1F are diagrams of an example implementation 100 associated with utilizing computer vision and machine learning for determining utilization metrics for a space. As shown in FIGS. 1A-1F, example implementation 100 includes an optimization system that utilizes a camera and a location sensor to obtain image data and location data, respectively, associated with a space (e.g., in a warehouse) with racks and objects stored on the racks and utilizes computer vision and machine learning to determine utilization metrics (e.g., warehouse operational metrics) for the space, as described herein. These devices are described in more detail below in connection with FIG. 3 and FIG. 4.

As shown in FIG. 1A, and by reference number 105, the optimization system receives image data identifying images of a space with racks and objects stored on the racks from the camera. The optimization system may receive the image data from one or more cameras associated with the space. In some implementations, the one or more cameras include a red-green-blue (RGB) camera and the image data includes RGB images of the space. The space may be an indoor space and/or an outdoor space, such as a space in a warehouse, a space associated with maintenance, production, and/or manufacturing operations, an office space, a space in a store, an entertainment space, a public space, and/or the like.

The images of the space may include a plurality of images of the space from multiple angles and/or multiple positions. In some implementations, the images of the space are captured by a plurality of cameras. The plurality of cameras may be located within, and/or adjacent to, the space to enable the plurality of cameras to capture images of the entire space. Alternatively, and/or additionally, the images of the space may be captured by a single camera that captures images of the space from multiple angles and/or multiple positions. For example, the camera may be carried by, attached to, and/or a component of, an autonomous vehicle, a robot, a user, and/or the like and may capture the images of the space as the autonomous vehicle, the robot, the user, and/or the like travels through and/or around the space.

In some implementations, the image data includes location data identifying respective locations of the camera associated with each of the images of the space. For example, the camera may be associated with a global positioning system (GPS) device that determines location data indicating a location of the camera and/or a time at which the camera was at the location based on the camera capturing an image of the space. The camera may provide the location data and the captured image to the optimization system.

In some implementations, the optimization system processes the image data to remove overlapping and/or redundant portions of the image data. As an example, the image data may include a first image of the space and a second image of the space. The first image may be a first image of a rack captured from a first position. The second image may be a second image of the rack captured from a second position. The optimization system may identify a portion of the second image that overlaps (e.g., depicts a same portion of the rack) with a portion of the first image. The optimization system may remove the portion of the second image based on the portion of the second image overlapping with the portion of the first image.

As shown by reference number 110, the optimization system receives location data identifying location coordinates associated with the images from the location sensor. The location sensor may determine the location data from multiple angles and/or multiple positions to obtain location data associated with each rack and/or object located within the space. In some implementations, the location sensor is co-located with the camera. For example, the location sensor and the camera may be included in the same device. The location sensor may obtain location data based on the camera capturing an image of the space and may associate the location data with the captured image (e.g., by including information identifying the captured image (e.g., a time stamp, an image identifier, and/or the like) in the location data). Alternatively, and/or additionally, the location sensor and the camera may be included in separate devices.

In some implementations, the location sensor is a light detection and ranging (LIDAR) sensor and the location data includes a point cloud associated with a rack and/or an object depicted in an image. The point cloud may be a set of data points in space representing a three-dimensional (3D) shape (e.g., a rack and/or an object). Each data point, in the set of data points, may be associated with a respective set of coordinates (e.g., X, Y, and Z coordinates) corresponding to a surface of the 3D shape.

Figure 1B:
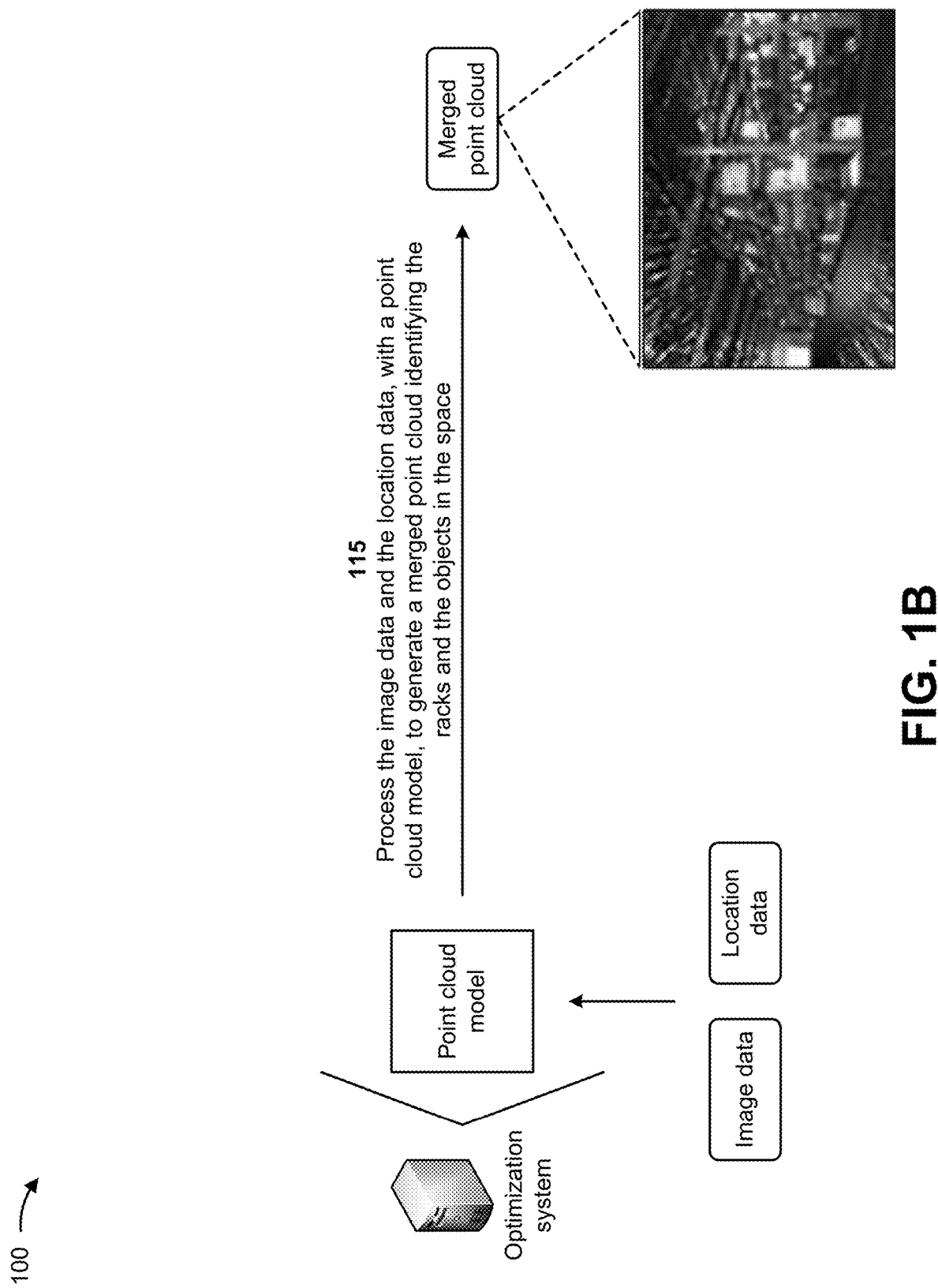

As shown in FIG. 1B, and by reference number 115, the optimization system processes the image data and the location data, with a point cloud model, to generate a merged point cloud identifying the racks and the objects in the space. The merged point cloud may comprise a colored point cloud that depicts the actual colors of racks and/or objects depicted in the images of the space. The optimization system may generate points for the racks based on sizes, shapes, and colors of the racks. The optimization system may generate points for the objects based on sizes, shapes, and colors of the objects. The optimization system may generate the merged point cloud based on the points for the racks and the points for the objects.

As an example, the optimization system may identify an image associated with a portion of the location data. The optimization system may merge the image with the portion of the location data to generate a colored point cloud associated with the image. The colored point cloud may depict the actual colors of each rack and/or object depicted in the image. The merged point cloud may depict the structure of each rack and/or object depicted in the image as points that capture location information and the original color of each rack and/or object as depicted in the image. In this way, the merged point cloud may depict racks and/or objects having varying sizes, shapes, and/or colors.

Figure 1C:
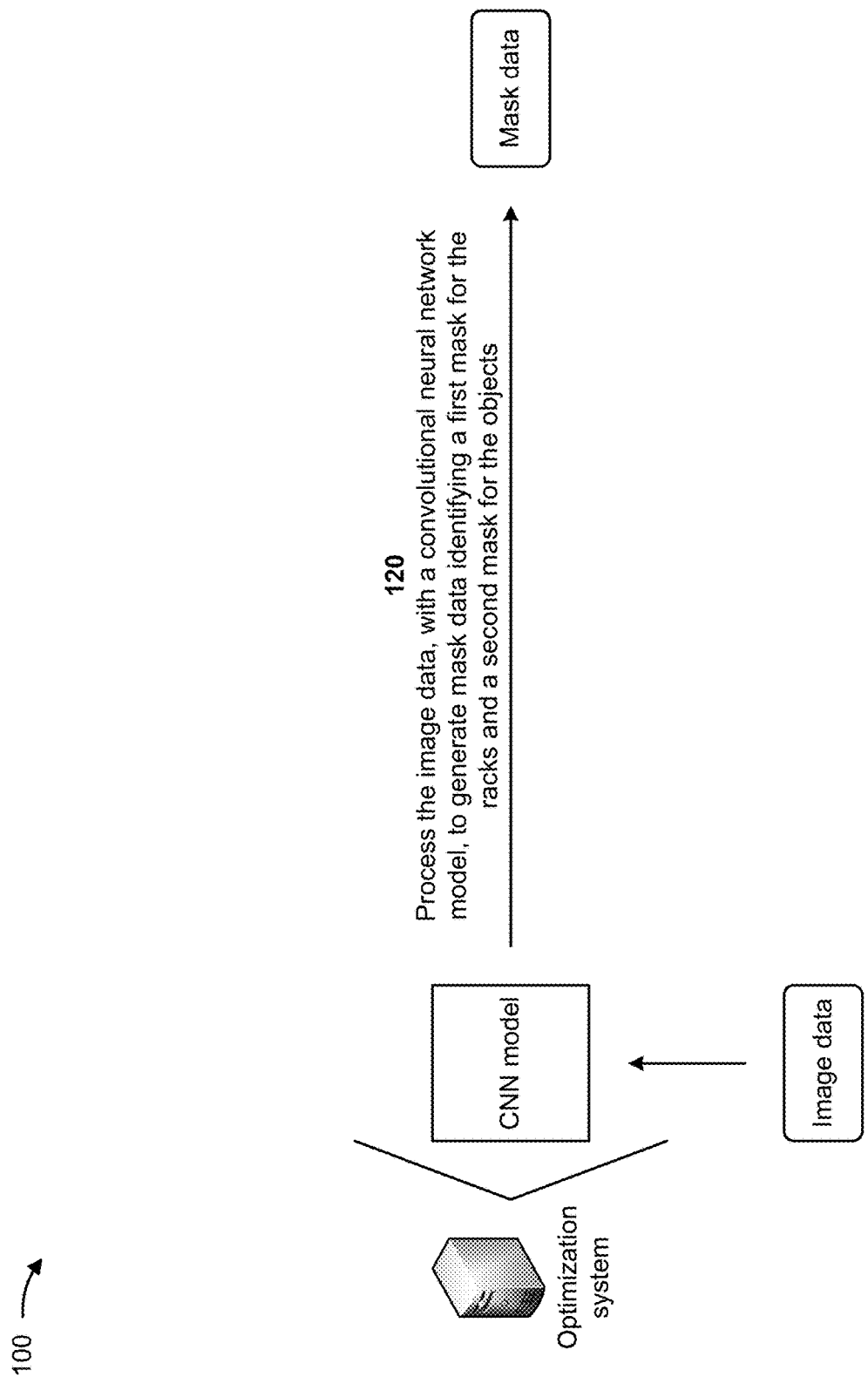

As shown in FIG. 1C, and by reference number 120, the optimization system processes the image data, with a convolutional neural network (CNN) model, to generate mask data identifying a first mask for the racks and a second mask for the objects. The CNN model may include a two-dimensional CNN model for semantic segmentation. The optimization system may utilize supervised machine learning to train the CNN model to identify a semantic class associated with each pixel of the image and to group pixels associated with the same semantic class. In some implementations, the semantic class may be a rack, an object (e.g., a type of product (e.g., food, tools, clothing, women's clothing, and/or the like), a particular product (e.g., soap, shirts, and/or the like), and/or another type of object), a storage element (e.g., a bin, a drawer, and/or the like), and/or an empty space.

The optimization system may identify first portions of the image data that correspond to racks depicted in the images. The racks may have various sizes, shapes, configurations, and/or the like. The optimization system may determine that the first portions of the image data are associated with a first semantic class (e.g., rack) based on the first portions of the image data corresponding to racks depicted in the image data. The optimization system may group the first portions of the image data into a first group of data based on the first portions of the image data being associated with the first semantic class. The optimization system may correlate a first mask with the first group of data. The first mask may include a first color that is provided over images of the racks (e.g., over the first portions of the image data).

In some implementations, the optimization system utilizes a colorization process to correlate the first mask with the first group of data. The colorization process may cause the original colors of the portions of the images corresponding to the first portions of image data to be overridden with the first color and integrated with associated location data.

The optimization system may identify second portions of the image data that correspond to objects depicted in the images. The objects may include various types of objects having various sizes, shapes, configurations, and/or the like. The optimization system may determine that the second portions of the image data are associated with a second semantic class (e.g., object) based on the second portions of the image data corresponding to objects depicted in the image data. The optimization system may group the second portions of the image data into a second group of data based on the second portions of the image data being associated with the second semantic class. The optimization system may correlate a second mask with the second group of data. The optimization system may correlate the second mask with the second group of data in a manner similar to that described above. The second mask may include a second color that is different from the first color and is provided over images of the objects (e.g., over the second portions of the image data).

In some implementations, the optimization system identifies third portions of the image data that correspond to empty portions of the space depicted in the images. The optimization system may determine that the third portions of the image data are associated with a third semantic class (e.g., empty space) based on the third portions of the image data corresponding to empty space depicted in the image data. The optimization system may group the third portions of the image data into a third group of data based on the third portions of the image data being associated with the third semantic class. The optimization system may correlate a third mask with the third group of data. The optimization system may correlate the third mask with the third group of data in a manner similar to that described above. The third mask may be provided over images of the empty space (e.g., over the third portions of the image data). The third color may be different from the first color and the second color.

In some implementations, the optimization system identifies fourth portions of the image data that correspond to storage elements depicted in the images. The storage elements may include various types of storage elements having various sizes, shapes, configurations, and/or the like. The optimization system may determine that the fourth portions of the image data are associated with a fourth semantic class (e.g., storage element) based on the fourth portions of the image data corresponding to storage elements depicted in the image data. The optimization system may group the fourth portions of the image data into a fourth group of data based on the fourth portions of the image data being associated with the fourth semantic class. The optimization system may correlate a fourth mask with the fourth group of data. The optimization system may correlate the fourth mask with the fourth group of data in a manner similar to that described above. The fourth mask may be provided over images of the storage elements (e.g., over the fourth portions of the image data). The fourth color may be different from the first color, the second color, and the third color.

Figure 1D:
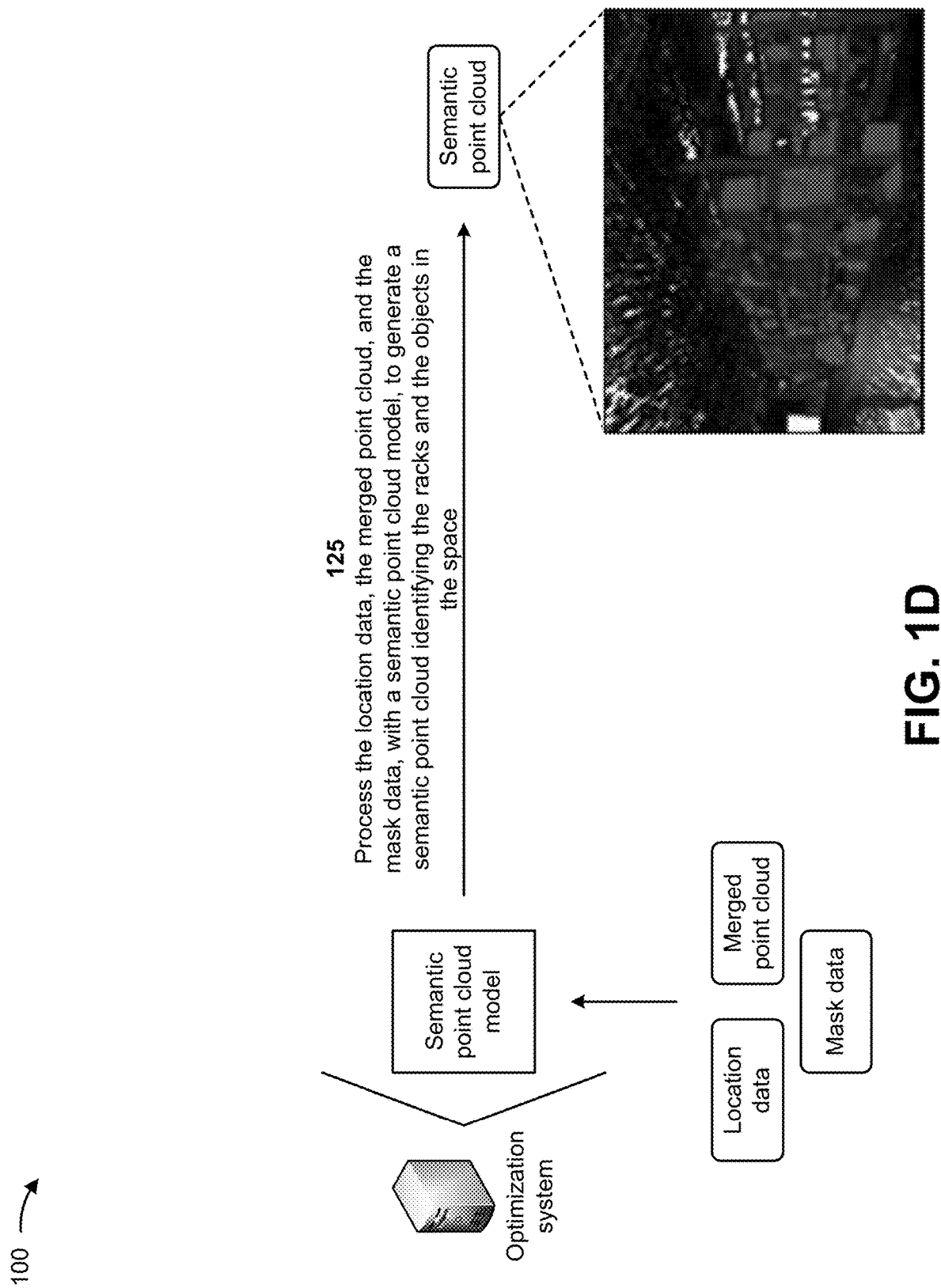

As shown in FIG. 1D, and by reference number 125, the optimization system processes the location data, the merged point cloud, and the mask data, with a semantic point cloud model, to generate a semantic point cloud identifying the racks and the objects in the space. The semantic point cloud may depict a relationship between spatial features within the space. For example, the semantic point cloud may depict an outline of racks, objects, storage elements, and/or empty spaces depicted in the images of the space.

The optimization system may modify the merged point cloud with the mask data to generate a modified merged point cloud. The modified merged point cloud may provide an outline of data points corresponding to a rack depicted in the first color, an outline of data points corresponding to an object within the rack depicted in the second color, an outline of data points corresponding to a storage element depicted in the third color, and/or an outline of an empty space depicted in the fourth color. The optimization system may integrate the modified merged point cloud with the location data to generate the semantic point cloud.

Figure 1E:
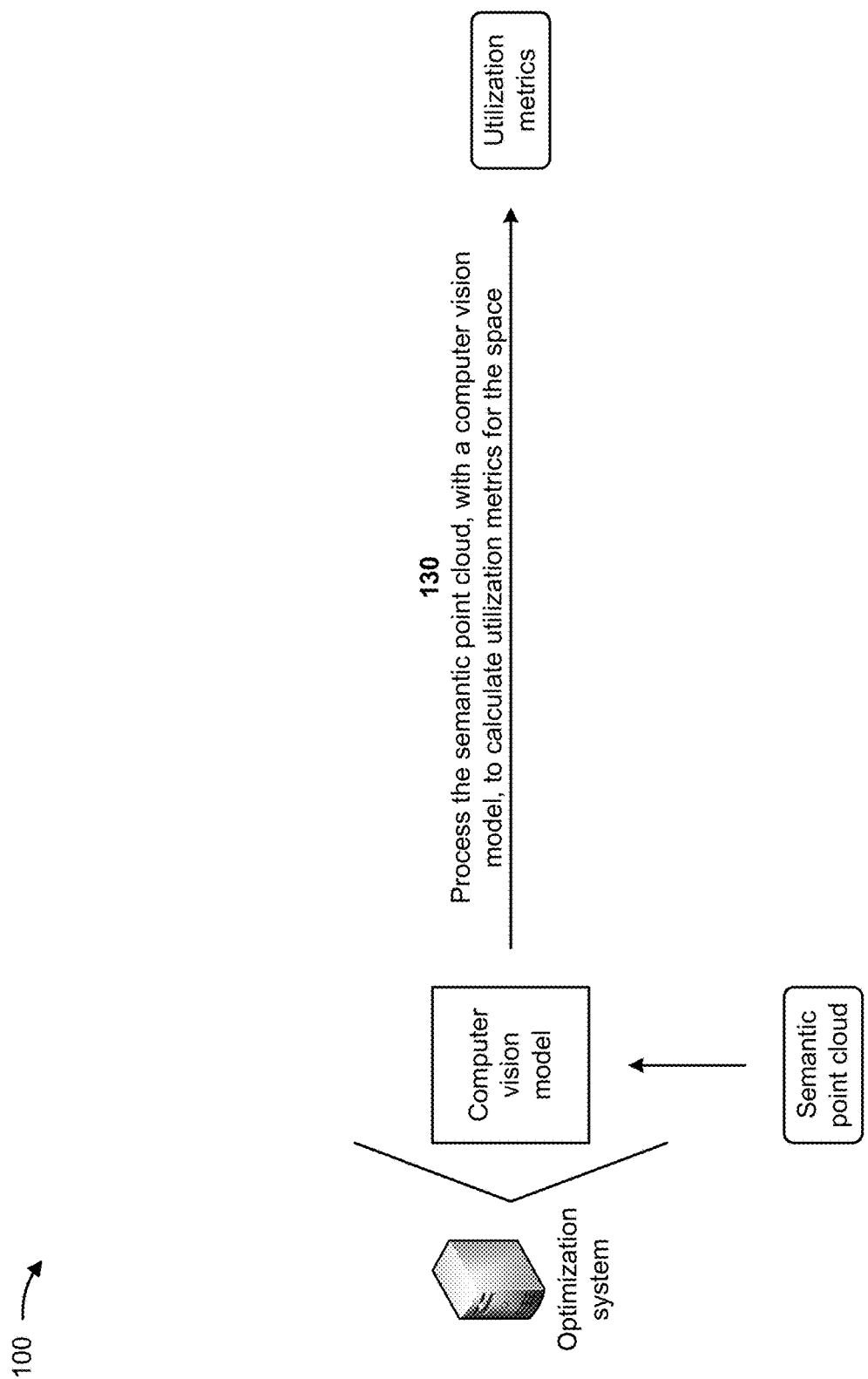

As shown in FIG. 1E, and by reference number 130, the optimization system processes the semantic point cloud, with a computer vision model, to calculate utilization metrics for the space. The utilization metrics may include a metric indicating utilization of the space, a metric indicating a capacity of the space, a metric indicating a capability classification of the space, a metric indicating a functional classification of the space, a metric indicating an operational compliance of the space, and/or the like.

In some implementations, the utilization metrics include an overall utilization metric. The overall utilization metric may indicate a portion of a rack currently being utilized (e.g., a portion of the rack containing objects). The optimization system may rasterize the semantic point cloud as pixels and/or voxels. The optimization system may define edges for images of the racks along a plurality of dimensions based on the pixels and/or the voxels. In some implementations, the edges are defined as a linear set of points. In some implementations, the optimization system removes noise in the semantic point cloud that causes distortion of the images of the rack. The optimization system may isolate each individual rack in the images of the racks. The optimization system may orient each rack along an axis. For example, the optimization system may orient each rack along the Y-axis.

The optimization system may determine distances between the edges of the images of the racks and the closest pixel and/or voxel. For example, the optimization system may line scan a pixel corresponding to an edge of a rack (e.g., a contour pixel) and may measure a distance between the contour pixel and a closest pixel in an inward direction relative to the edge of the rack. The optimization system may determine a respective distance for each contour pixel.

The optimization system may calculate the overall utilization metric based on the distances. For example, the optimization system may determine whether the distance between the contour pixel and the closest pixel satisfies a distance threshold. The optimization system may designate the contour pixel as a utilized pixel based on whether the distance satisfies the distance threshold. For example, the optimization system may designate the contour pixel as the utilized pixel when the distance fails to satisfy the distance threshold.

The optimization system may calculate the overall utilization metric based on a total quantity of the contour pixels that are designated as utilized pixels. For example, the optimization system may calculate the overall utilization metric based on dividing the quantity of contour pixels designated as utilized pixels by the total quantity of contour pixels.

In some implementations, the optimization system calculates a capacity metric indicating a capacity of the space. The optimization system may determine distances between opposite (e.g., left and right relative to the Y-axis, top and bottom relative to the X-axis, and/or the like) edges of a rack. The optimization system may determine a capacity metric associated with the rack based on the distances between the opposite edges of the rack. For example, the optimization system may determine the capacity metric based on multiplying the distances between the opposite edges.

Figure 1F:
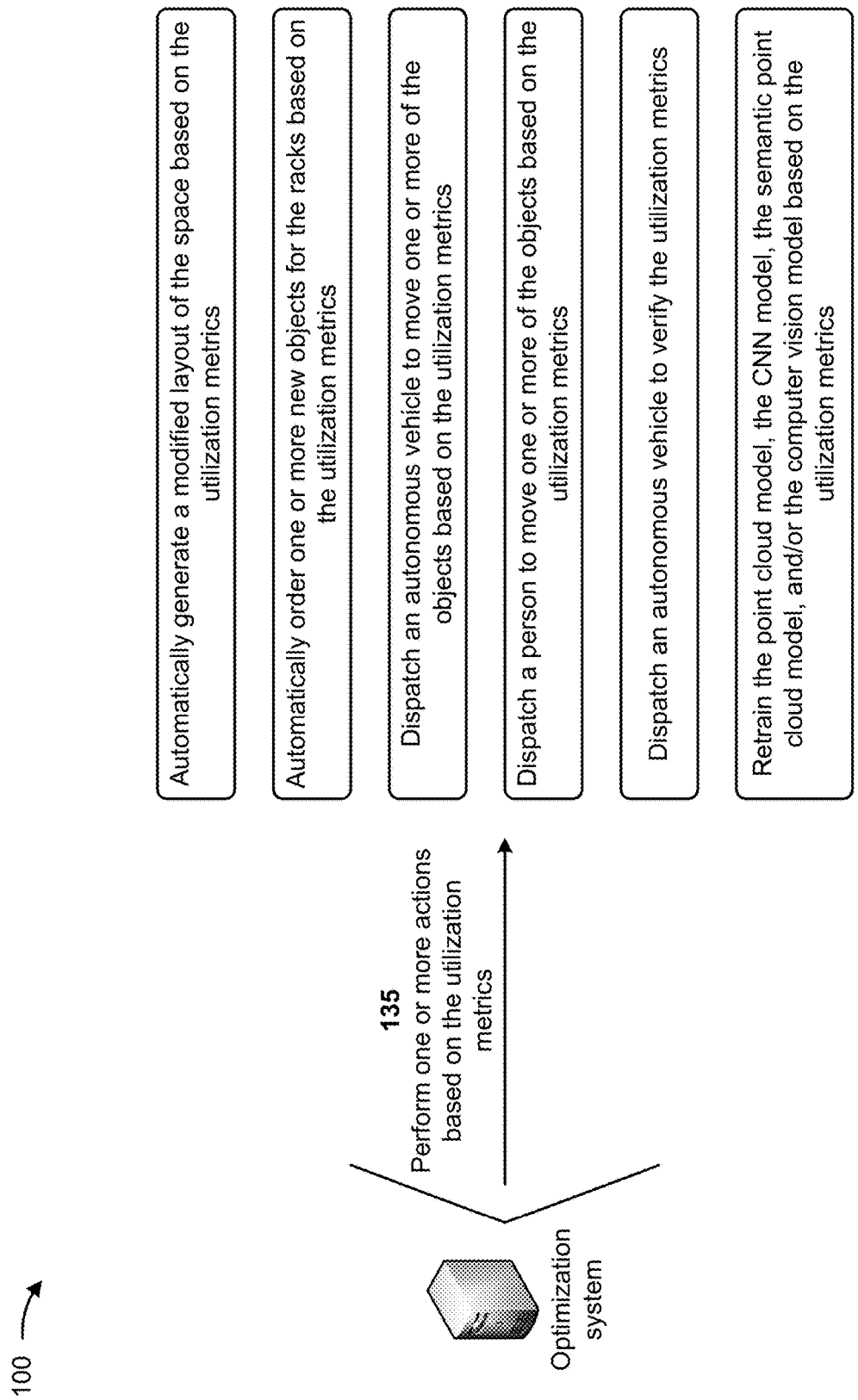

As shown in FIG. 1F, and by reference number 135, the optimization system performs one or more actions based on the utilization metrics. In some implementations, the one or more actions include the optimization system automatically generating a modified layout of the space based on the utilization metrics. The optimization system may generate the modified layout of the space based on the edges of the racks indicated in the semantic point cloud. The optimization system may include information identifying the utilization metric associated with each rack. The information identifying the utilization metric associated with a rack may include information indicating a percentage of the rack currently being utilized, information indicating a percentage of the rack that is currently unutilized, and/or the like.

In some implementations, the optimization system determines that an initial layout of the space is incorrect based on the semantic point cloud. For example, the optimization system may determine that the semantic point cloud depicts a rack not included in the initial layout of the space. The optimization system may generate a modified layout of the space, that includes the rack not included in the initial layout of the space, based on the semantic point cloud depicting the rack.

In some implementations, the optimization system generates the modified layout of the space based on consolidating two racks. The optimization system may determine that the objects located on a first rack can be moved to a second rack based on the overall utilization metrics associated with the first rack and the second rack. As an example, the optimization system may determine that a capacity of the first rack is the same as a capacity of the second rack based on the capacity metrics associated with the first rack and the second rack. The optimization system may determine that ten percent of the first rack is currently being utilized based on the overall utilization metric associated with the first rack. The optimization system may determine that seventy percent of the second rack is currently being utilized based on the overall utilization metric associated with the second rack. The optimization system may determine that an unutilized portion of the second rack (e.g., thirty percent) is sufficient to store the objects located on the first rack based on the capacity of the second rack being the same as the capacity of the first rack. The optimization system may determine that the objects located on the first rack can be moved to the second rack based on the unutilized portion of the second rack being sufficient to store the objects located on the first rack. The optimization system may generate the modified layout to include the objects located on the first rack being on the second rack and/or the second rack being removed from the space based on determining that the objects located on the first rack can be moved to the second rack.

In some implementations, the one or more actions include the optimization system automatically ordering one or more new objects for the racks based on the utilization metrics. For example, the optimization system may automatically order one or more new objects for the racks based on determining that the overall utilization metric associated with the racks satisfies an overall utilization threshold.

In some implementations, the one or more actions include the optimization system dispatching an autonomous vehicle to move one or more of the objects based on the utilization metrics. For example, the optimization system may determine that the objects located on the first rack can be moved to the second rank and may generate the modified layout of the space, as described above. The optimization system may dispatch an autonomous vehicle to move the objects located on the first rack to the second rack based on the modified layout of the space. For example, the optimization system may transmit the modified layout of the space to the autonomous vehicle to cause the autonomous vehicle to move the objects located on the first rack to the second rack. In some implementations, the optimization system may provide the modified layout of the space to the autonomous vehicle as a navigation layout of fixed structures in the space. The autonomous vehicle may utilize the modified layout of the space to navigate through the space.

In some implementations, the one or more actions include the optimization system dispatching a person to move one or more of the objects based on the utilization metrics. For example, the optimization system may provide information identifying the modified layout of the space and/or information indicating that the objects on the first rack are to be moved to the second rack to a user device associated with a warehouse employee. The user device may receive the information and may provide the information for display to the warehouse employee. The warehouse employee may move the objects located on the first rack to the second rack based on the displayed information.

In some implementations, the one or more actions include the optimization system dispatching an autonomous vehicle to verify the utilization metrics. The optimization system may provide the utilization metrics to the autonomous vehicle. The autonomous vehicle may include a camera and a location sensor. The autonomous vehicle may capture images and location data of the space and may determine utilization metrics for the space in a manner similar to that described above. The autonomous vehicle may compare the utilization metrics determined by the autonomous vehicle and the utilization metrics received from the optimization system. The autonomous vehicle may verify the utilization metrics received from the optimization system based on the comparison.

In some implementations, the one or more actions include the optimization system retraining the point cloud model, the CNN model, the semantic point cloud model, and/or the computer vision model based on the utilization metrics. The optimization system may utilize the utilization metrics as additional training data for retraining the point cloud model, the CNN model, the semantic point cloud model, and/or the computer vision model, thereby increasing the quantity of training data available for training the point cloud model, the CNN model, the semantic point cloud model, and/or the computer vision model. Accordingly, the optimization system may conserve computing resources associated with identifying, obtaining, and/or generating historical utilization metrics for training the point cloud model, the CNN model, the semantic point cloud model, and/or the computer vision model relative to other systems for identifying, obtaining, and/or generating historical utilization metrics for training the point cloud model, the CNN model, the semantic point cloud model, and/or the computer vision model.

Further, increasing the amount of training data available for training the point cloud model, the CNN model, the semantic point cloud model, and/or the computer vision model may improve a respective accuracy of each of the point cloud model, the CNN model, the semantic point cloud model, and/or the computer vision model. By improving the accuracy of the point cloud model, the CNN model, the semantic point cloud model, and/or the computer vision model, the optimization system may conserve computing resources associated with inaccurately determining the utilization metrics, generating a modified layout of the space associated with the utilization metrics being inaccurately determined, and/or automatically performing one or more actions based on the utilization metrics being inaccurately determined.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
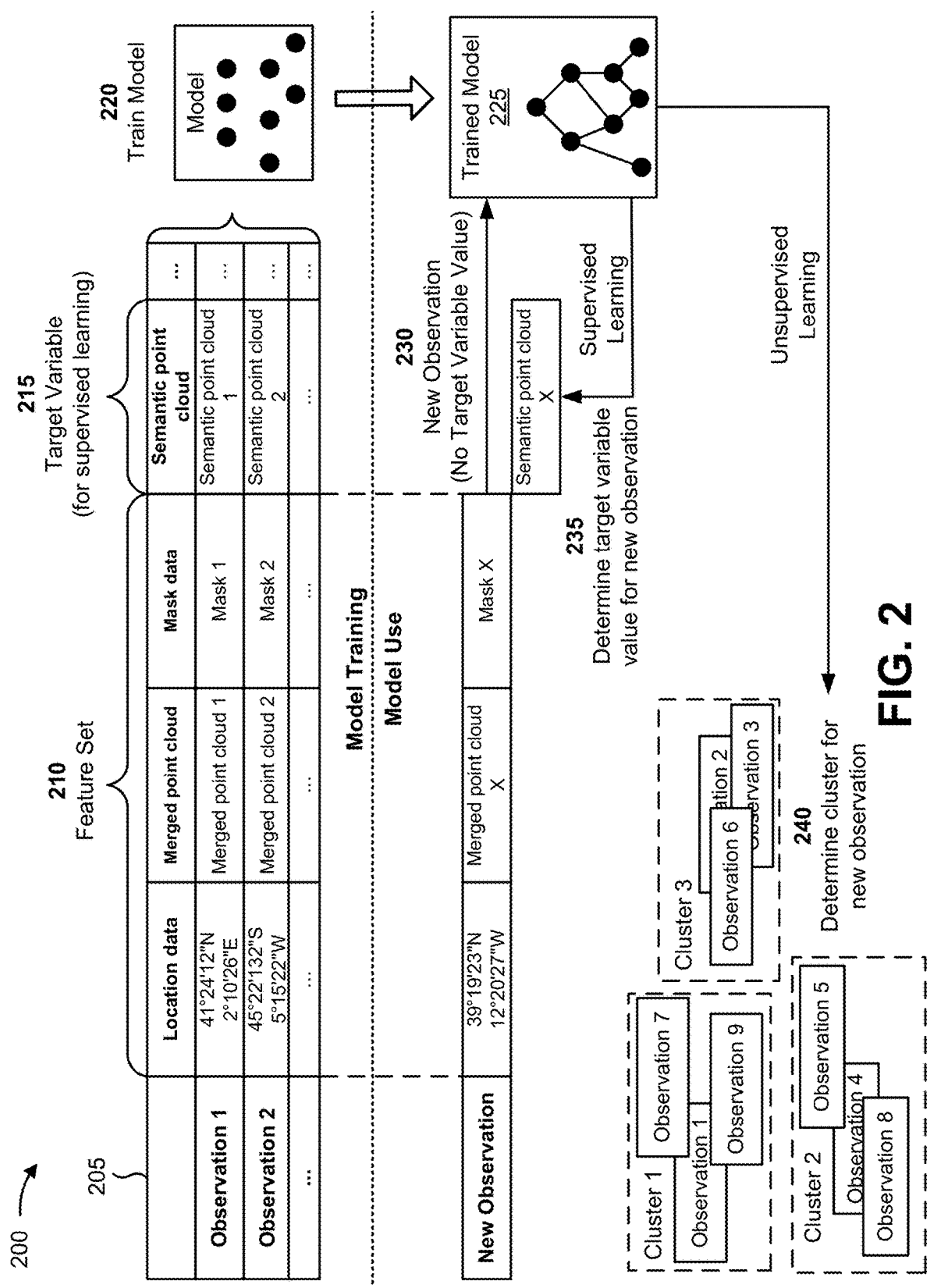
FIG. 2 is a diagram illustrating an example of training and using a machine learning model in connection with determining utilization metrics for a space.

FIG. 2 is a diagram illustrating an example 200 of training and using a machine learning model in connection with determining utilization metrics for a space. The machine learning model training and usage described herein may be performed using a machine learning system. The machine learning system may include or may be included in a computing device, a server, a cloud computing environment, or the like, such as the optimization system described in more detail elsewhere herein.

As shown by reference number 205, a machine learning model may be trained using a set of observations. The set of observations may be obtained from training data (e.g., historical data, synthetic data (e.g., data generated based on using a video game engine and/or a similar type of simulator to generate a virtual and realistic environment and generating the training data from it), and/or the like), such as data gathered during one or more processes described herein. In some implementations, the machine learning system may receive the set of observations (e.g., as input) from the optimization system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the optimization system. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of location data, a second feature of merged point cloud, a third feature of mask data, and so on. As shown, for a first observation, the first feature may have a value of 41° 24' 12" N, 2° 10' 26" E, the second feature may have a value of merged point cloud 1, the third feature may have a value of mask 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is semantic point cloud, which has a value of semantic point cloud 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of 45° 22' 132" N, 5° 15' 22" E, a second feature of merged point cloud X, a third feature of mask X, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of semantic point cloud X for the target variable of semantic point cloud for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster, then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to determining utilization metrics for a space. The machine learning system enables recognition and/or identification of tens, hundreds, thousands, or millions of features and/or feature values for tens, hundreds, thousands, or millions of observations, thereby increasing accuracy and consistency and reducing delay associated with determining utilization metrics for a space relative to requiring computing resources to be allocated for tens, hundreds, or thousands of operators to manually determining utilization metrics for a space using the features or feature values.

As indicated above, FIG. 2 is provided as an example. Other examples may differ from what is described in connection with FIG. 2.

Figure 3:
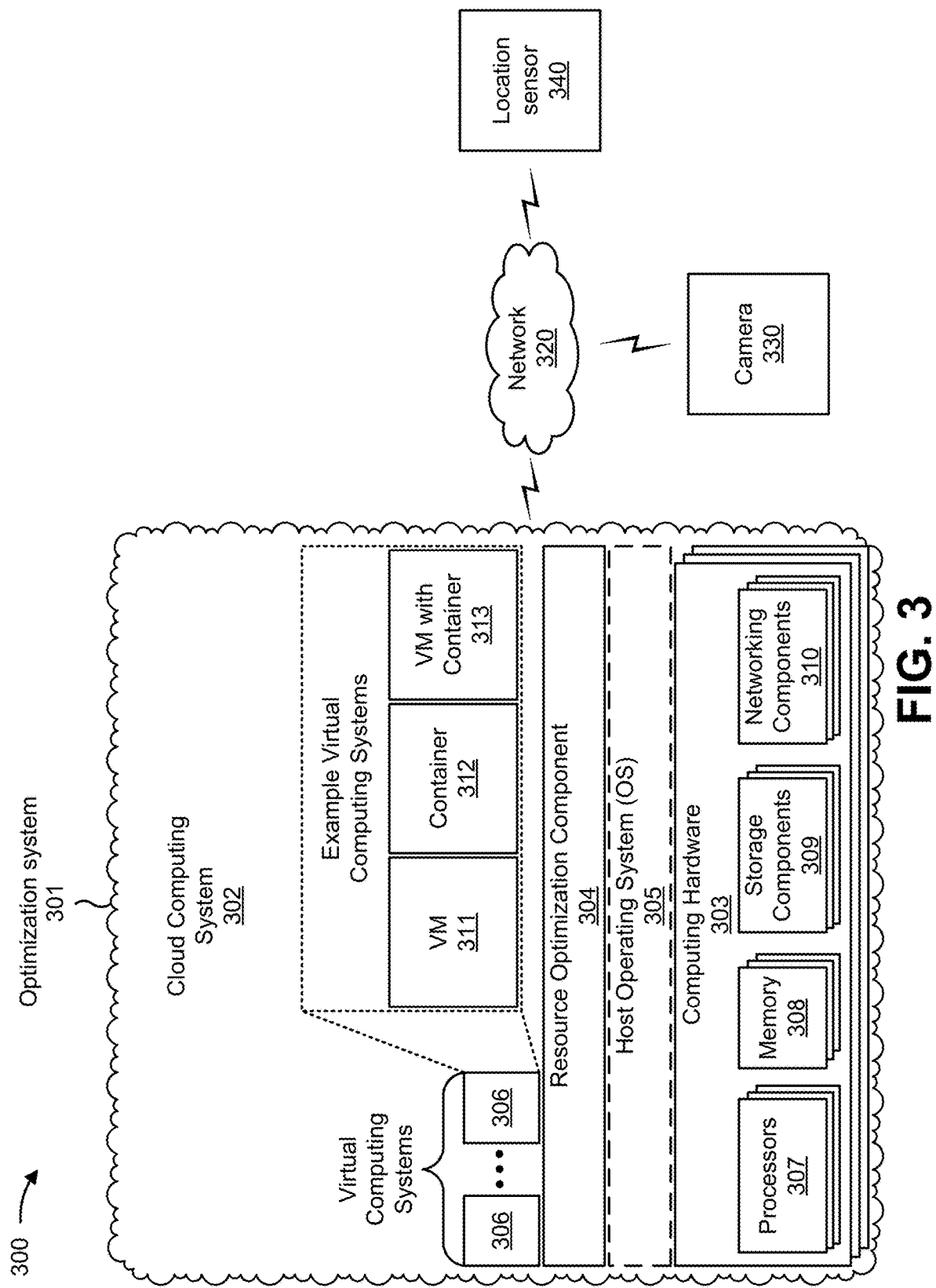
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a optimization system 301, which may include one or more elements of and/or may execute within a cloud computing system 302. The cloud computing system 302 may include one or more elements 303-313, as described in more detail below. As further shown in FIG. 3, environment 300 may include a network 320, a camera 330, and/or a location sensor 340. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the optimization system 301 may include one or more elements 303-313 of the cloud computing system 302, may execute within the cloud computing system 302, and/or may be hosted within the cloud computing system 302, in some implementations, the optimization system 301 may not be cloud-based (e.g., may be implemented outside of a cloud computing system) or may be partially cloud-based. For example, the optimization system 301 may include one or more devices that are not part of the cloud computing system 302, such as device 400 of FIG. 4, which may include a standalone server or another type of computing device. The optimization system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

Camera 330 may include one or more devices capable of capturing an image of an object. For example, camera 330 may include an RGB camera, a single-lens reflex camera, a visual spectrum imaging camera, an infrared or near infrared imaging camera, a multispectral imaging camera, a hyperspectral imaging camera, a thermal imaging camera, a laser mapping imagery camera, and/or the like.

Location sensor 340 may include one or more devices capable of determining a location and/or orientation of an object. For example, location sensor 340 may include a LIDAR sensor, a RADAR sensor, an ultrasonic sensor, an infrared proximity sensor, a laser distance sensor, and/or the like. The location sensor 340 may determine an angle and a distance to an object with respect to multiple, known locations of the camera 330 to enable a three dimensional location of the object, with respect to a known location, to be determined.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
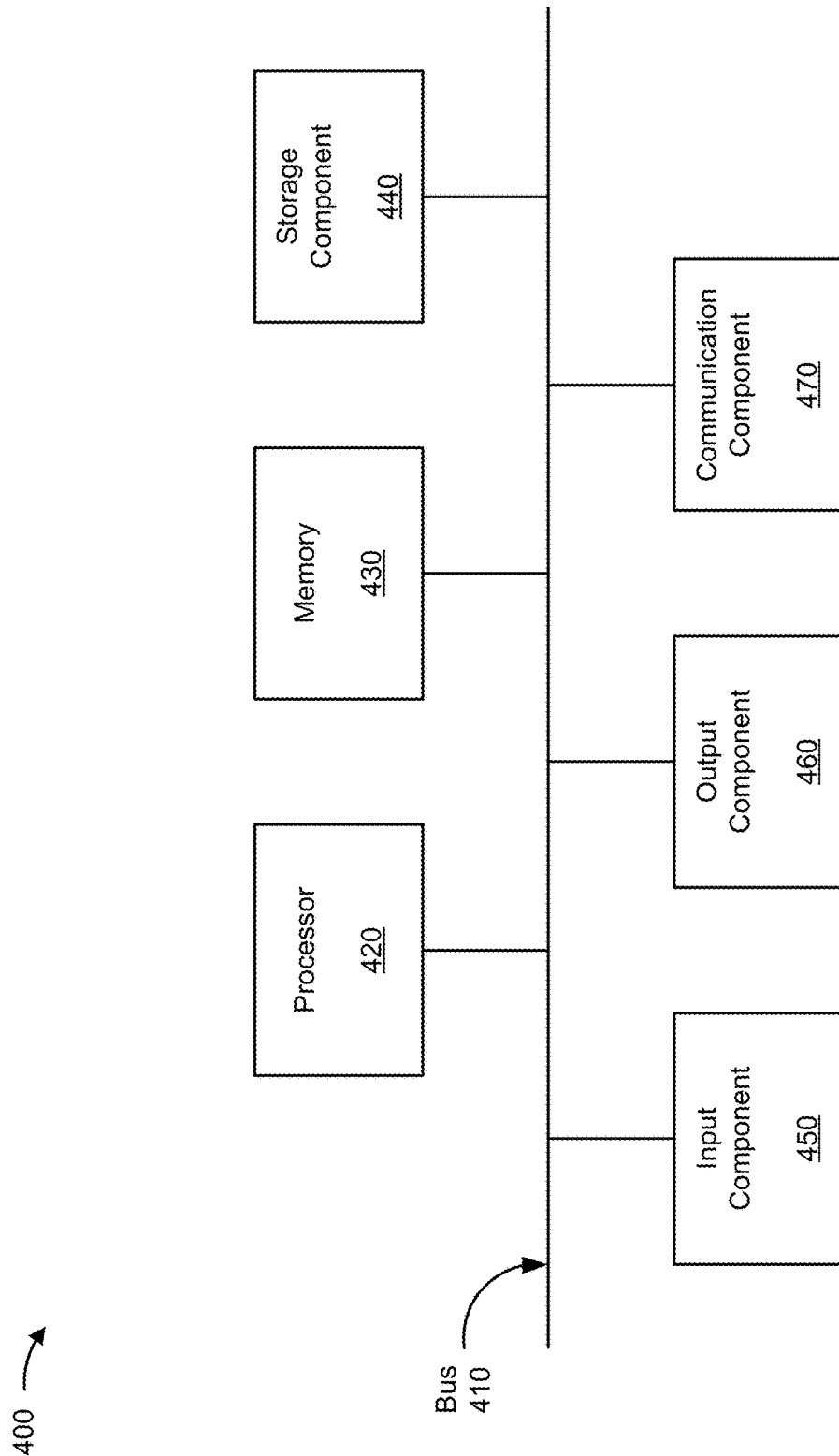
FIG. 4 is a diagram of example components of one or more devices of FIG. 3.

FIG. 4 is a diagram of example components of a device 400, which may correspond to optimization system 301, camera 330, and/or location sensor 340. In some implementations, optimization system 301, camera 330, and/or location sensor 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, and/or an actuator. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, and/or an antenna.

Device 400 may perform one or more processes described herein. For example, a non-transitory computer-readable medium (e.g., memory 430 and/or storage component 440) may store a set of instructions (e.g., one or more instructions, code, software code, and/or program code) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with utilizing computer vision and machine learning models for determining utilization metrics for a space. In some implementations, one or more process blocks of FIG. 5 may be performed by a device (e.g., optimization system 301). In some implementations, one or more process blocks of FIG. 5 may be performed by another device or a group of devices separate from or including the device, such as a camera (e.g., camera 330), and/or a location sensor (e.g., location sensor 340). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving image data identifying images of a space with racks and objects stored on the racks (block 510). For example, the device may receive image data identifying images of a space with racks and objects stored on the racks, as described above.

As further shown in FIG. 5, process 500 may include receiving location data identifying location coordinates associated with the images (block 520). For example, the device may receive location data identifying location coordinates associated with the images, as described above.

As further shown in FIG. 5, process 500 may include processing the image data and the location data, with a point cloud model, to generate a merged point cloud identifying the racks and the objects in the space (block 530). For example, the device may process the image data and the location data, with a point cloud model, to generate a merged point cloud identifying the racks and the objects in the space, as described above.

In some implementations, when processing the image data and the location data, with the point cloud model, to generate the merged point cloud the device may generate points for the racks based on sizes, shapes, and colors of the racks. The device may generate points for the objects based on sizes, shapes, and colors of the objects. The device may generate the merged point cloud based on the points for the racks and the points for the objects.

As further shown in FIG. 5, process 500 may include processing the image data, with a CNN model, to generate mask data identifying at least a first mask for the racks and a second mask for the objects (block 540). For example, the device may process the image data, with a CNN model, to generate mask data identifying at least a first mask for the racks and a second mask for the objects, as described above. The CNN model may include a two-dimensional CNN model for semantic segmentation.

In some implementations, processing the image data, with the CNN model, to generate the mask data may comprise identifying first portions of the image data that correspond to the racks, grouping the first portions of the image data into a first group of data, correlating the first mask with the first group of data, identifying second portions of the image data that correspond to the objects, grouping the second portions of the image data into a second group of data, and correlating the second mask with the second group of data. The first mask may include a first color that is provided over images of the racks and the second mask may include a second, different color that is provided over images of the objects.

Alternatively, and/or additionally, processing the image data with the CNN model may comprise identifying third portions of the image data that correspond to empty portions of the space, grouping the third portions of the image data into a third group of data, and correlating a third mask with the third group of data.

As further shown in FIG. 5, process 500 may include processing the location data, the merged point cloud, and the mask data, with a semantic point cloud model, to generate a semantic point cloud identifying the racks and the objects in the space (block 550). For example, the device may process the location data, the merged point cloud, and the mask data, with a semantic point cloud model, to generate a semantic point cloud identifying the racks and the objects in the space, as described above.

In some implementations, processing the location data, the merged point cloud, and the mask data with the semantic point cloud model to generate the semantic point cloud may comprise modifying the merged point cloud with the mask data to generate a modified merged point cloud; and integrating the modified merged point cloud with the location data to generate the semantic point cloud.

As further shown in FIG. 5, process 500 may include processing the semantic point cloud, with a computer vision model, to calculate utilization metrics for the space (block 560). For example, the device may process the semantic point cloud, with a computer vision model, to calculate utilization metrics for the space, as described above. The utilization metrics may include one or more of a metric indicating utilization of the space, a metric indicating a capacity of the space, a metric indicating a capability classification of the space, a metric indicating a functional classification of the space, or a metric indicating an operational compliance of the space.

In some implementations, when processing the semantic point cloud with the computer vision model to calculate the utilization metrics the device may rasterize the semantic point cloud as voxels. The device may define edges for images of the racks along a plurality of dimensions based on the voxels. The device may remove noise in the voxels that cause distortion of the edges. The device may isolate each individual rack in the images of the racks. The device may determine distances between the edges of the images of the racks and the closest voxels. The device may calculate the utilization metrics based on the distances. For example, the device may scan inwards starting at an edge or a boundary point, pixel, and/or voxel of a rack until the first point, pixel, and/or voxel labeled as an object in the semantic point cloud is identified. The device may label the identified point, pixel, and/or voxel as utilized based on the identified point, pixel, and/or voxel being labeled as an object in the semantic point cloud. The device may label points, pixels, and/or voxels not labeled as objects in the point cloud as unoccupied. The device may continue processing the remaining edges and/or boundaries of each storage structure in a similar manner.

As further shown in FIG. 5, process 500 may include performing one or more actions based on the utilization metrics (block 570). For example, the device may perform one or more actions based on the utilization metrics, as described above. In some implementations, performing the one or more actions comprises one or more of automatically generating a modified layout of the space based on the utilization metrics, automatically ordering one or more new objects for the racks based on the utilization metrics, or dispatching an autonomous vehicle to verify the utilization metrics.

Alternatively, and/or additionally, performing the one or more actions comprises one or more of dispatching an autonomous vehicle to move one or more of the objects based on the utilization metrics, dispatching a person to move one or more of the objects based on the utilization metrics, or retraining one or more of the point cloud model, the convolutional neural network model, the semantic point cloud model, or the computer vision model based on the utilization metrics.

In some implementations, performing the one or more actions may include generating a floorplan of the space based on the utilization metrics; and providing the floorplan for display. Alternatively, and/or additionally, performing the one or more actions may include providing the utilization metrics for display.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, image data identifying images of a space with racks and objects stored on the racks;
   receiving, by the device, location data identifying location coordinates associated with the images;
   processing, by the device, the image data and the location data, with a point cloud model, to generate a merged point cloud identifying the racks and the objects in the space;
   processing, by the device, the image data, with a convolutional neural network model, to generate mask data identifying at least a first mask for the racks and a second mask for the objects,
      wherein processing the image data comprises:
         identifying first portions of the image data that correspond to the racks,
         grouping the first portions of the image data into a first group of data,
         correlating the first mask with the first group of data,
         identifying second portions of the image data that correspond to the objects,
         grouping the second portions of the image data into a second group of data,
         correlating the second mask with the second group of data,
         identifying third portions of the image data that correspond to empty portions of the space,
         grouping the third portions of the image data into a third group of data, and
         correlating a third mask with the third group of data;
   processing, by the device, the location data, the merged point cloud, and the mask data, with a semantic point cloud model, to generate a semantic point cloud identifying the racks and the objects in the space;
   processing, by the device, the semantic point cloud, with a computer vision model, to calculate utilization metrics for the space; and
   performing, by the device, one or more actions based on the utilization metrics.

2. The method of claim 1, wherein performing the one or more actions comprises one or more of:
   automatically generating a modified layout of the space based on the utilization metrics;
   automatically ordering one or more new objects for the racks based on the utilization metrics; or
   dispatching an autonomous vehicle to verify the utilization metrics.

3. The method of claim 1, wherein performing the one or more actions comprises one or more of:
   dispatching an autonomous vehicle to move one or more of the objects based on the utilization metrics;
   dispatching a person to move one or more of the objects based on the utilization metrics; or
   retraining one or more of the point cloud model, the convolutional neural network model, the semantic point cloud model, or the computer vision model based on the utilization metrics.

4. The method of claim 1, wherein the utilization metrics includes one or more of:
   a metric indicating utilization of the space,
   a metric indicating a capacity of the space,
   a metric indicating a capability classification of the space,
   a metric indicating a functional classification of the space, or
   a metric indicating an operational compliance of the space.

5. The method of claim 1, wherein processing the image data and the location data, with the point cloud model, to generate the merged point cloud comprises:

generating points for the racks based on sizes, shapes, and colors of the racks;
generating points for the objects based on sizes, shapes, and colors of the objects; and
generating the merged point cloud based on the points for the racks and the points for the objects.

6. The method of claim 1, wherein the semantic point cloud depicts an outline of the racks, the objects, and empty spaces.

7. The method of claim 1, further comprising:
modifying the merged point cloud with the mask data to generate a modified merged point cloud,
wherein the modified merged point cloud provides one or more of:
an outline of data points corresponding to a rack, of the racks, depicted in a first color,
an outline of data points corresponding to an object, of the objects, within the rack depicted in a second color,
an outline of data points corresponding to a storage element depicted in a third color, or
an outline of an empty space depicted in a fourth color.

8. A device, comprising:
one or more memories; and
one or more processors, communicatively coupled to the one or more memories, configured to:
receive image data identifying images of a space with racks and objects stored on the racks;
receive location data identifying location coordinates associated with the images;
process the image data and the location data, with a point cloud model, to generate a merged point cloud identifying the racks and the objects in the space;
process the image data, with a convolutional neural network model, to generate mask data identifying at least a first mask for the racks and a second mask for the objects;
process the location data, the merged point cloud, and the mask data, with a semantic point cloud model, to generate a semantic point cloud identifying the racks and the objects in the space;
process the semantic point cloud, with a computer vision model, to calculate utilization metrics for the space,
wherein the utilization metrics include one or more of:
a metric indicating utilization of the space,
a metric indicating a capacity of the space,
a metric indicating a capability classification of the space,
a metric indicating a functional classification of the space, or
a metric indicating an operational compliance of the space, and
wherein the one or more processors, to process the semantic point cloud, with the computer vision model, to calculate the utilization metrics, are configured to:
rasterize the semantic point cloud as voxels,
define edges for images of the racks along a plurality of dimensions based on the voxels,
remove noise in the voxels that cause distortion of the edges;
isolate each individual rack in the images of the racks,
determine distances between the edges of the images of the racks and closest voxels,
wherein the closest voxels comprise particular voxels within the semantic point cloud closest to the edges, and calculate the utilization metrics based on the distances; and
perform one or more actions based on the utilization metrics.

9. The device of claim 8, wherein the first mask includes a first color that is provided over images of the racks, and the second mask includes a second color, different than the first color, that is provided over images of the objects.

10. The device of claim 8, wherein the convolutional neural network model includes a two-dimensional convolutional neural network model for semantic segmentation.

11. The device of claim 8, wherein the one or more processors, when processing the location data, the merged point cloud, and the mask data, with the semantic point cloud model, to generate the semantic point cloud, are configured to:
modify the merged point cloud with the mask data to generate a modified merged point cloud; and
integrate the modified merged point cloud with the location data to generate the semantic point cloud.

12. The device of claim 8, wherein the one or more processors, when performing the one or more actions, are configured to:
generate a floorplan of the space based on the utilization metrics; and
provide the floorplan for display.

13. The device of claim 8, wherein the one or more processors, when performing the one or more actions, are configured to:
provide the utilization metrics for display.

14. The device of claim 8, wherein the one or more processors, to determine the distances between the edges and the closest voxels, are configured to:
scan inwards at an edge, of the edges, until a first voxel labeled as an object in the semantic point cloud is identified.

15. A non-transitory computer-readable medium storing a set of instructions, the set of instructions comprising:
one or more instructions that, when executed by one or more processors of a device, cause the device to:
receive image data identifying images of a space with racks and objects stored on the racks;
receive location data identifying location coordinates associated with the images;
process the image data and the location data, with a point cloud model, to generate a merged point cloud identifying the racks and the objects in the space;
process the image data, with a convolutional neural network model, to generate mask data identifying at least a first mask for the racks and a second mask for the objects;
process the location data, the merged point cloud, and the mask data, with a semantic point cloud model, to generate a semantic point cloud identifying the racks and the objects in the space;
process the semantic point cloud, with a computer vision model, to calculate utilization metrics for the space,
wherein the one or more instructions, that cause the device to process the semantic point cloud, with the computer vision model, to calculate the utilization metrics, cause the device to:
rasterize the semantic point cloud as voxels, define edges of images of the racks along a plurality of dimensions based on the voxels,
remove noise in the voxels that cause distortion of the edges,
isolate each individual rack in the images of the racks after removing the noise in the voxels,
determine distances between the edges of the images of the racks and closest voxels,
wherein the closest voxels comprise particular voxels within the semantic point cloud closest to the edges, and
calculate the utilization metrics based on the distances;
generate a floorplan of the space based on the utilization metrics; and
provide the floorplan for display.

16. The non-transitory computer-readable medium of claim 15, wherein the one or more instructions further cause the device to do one or more of:
automatically generate a modified layout of the space based on the utilization metrics;
automatically order one or more new objects for the racks based on the utilization metrics;
dispatch an autonomous vehicle to verify the utilization metrics;
dispatch an autonomous vehicle to move one or more of the objects based on the utilization metrics;
dispatch a person to move one or more of the objects based on the utilization metrics; or
retrain one or more of the point cloud model, the convolutional neural network model, the semantic point cloud model, or the computer vision model based on the utilization metrics.

17. The non-transitory computer-readable medium of claim 15, wherein the one or more instructions, that cause the device to process the image data and the location data, with the point cloud model, to generate the merged point cloud, cause the device to:
generate points for the racks based on sizes, shapes, and colors of the racks;
generate points for the objects based on sizes, shapes, and colors of the objects; and
generate the merged point cloud based on the points for the racks and the points for the objects.

18. The non-transitory computer-readable medium of claim 15, wherein the one or more instructions, that cause the device to process the image data, with the convolutional neural network model, to generate the mask data, cause the device to:
identify first portions of the image data that correspond to the racks;
group the first portions of the image data into a first group of data;
correlate the first mask with the first group of data;
identify second portions of the image data that correspond to the objects;
group the second portions of the image data into a second group of data; and
correlate the second mask with the second group of data.

19. The non-transitory computer-readable medium of claim 15, wherein the one or more instructions, that cause the device to process the location data, the merged point cloud, and the mask data, with the semantic point cloud model, to generate the semantic point cloud, cause the device to:
modify the merged point cloud with the mask data to generate a modified merged point cloud; and
integrate the modified merged point cloud with the location data to generate the semantic point cloud.

20. The non-transitory computer-readable medium of claim 15, wherein the one or more instructions, that cause the device to process the semantic point cloud, with the computer vision model, to calculate the utilization metrics, cause the device to:
label a set of voxels not labeled as objects in the semantic point cloud as unoccupied.

* * * * *